(12) United States Patent
Poppleton

(10) Patent No.: US 6,433,840 B1
(45) Date of Patent: Aug. 13, 2002

(54) METHOD AND APPARATUS FOR MULTI-LEVEL IMAGE ALIGNMENT

(75) Inventor: Kenneth A. Poppleton, Salt Lake City, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 09/358,939

(22) Filed: Jul. 22, 1999

(51) Int. Cl.$^7$ .............................. H04N 3/26; H04N 3/22
(52) U.S. Cl. ........................................ 348/745; 348/806
(58) Field of Search .................................. 348/745, 746, 348/747, 190, 806, 807; 345/647, 611; 315/368.13, 368.11, 368.16

(56) References Cited

U.S. PATENT DOCUMENTS

| | | | | |
|---|---|---|---|---|
| 4,422,019 A | * | 12/1983 | Meyer | 315/368.13 |
| 4,672,275 A | * | 6/1987 | Ando | 315/368.12 |
| RE33,973 E | * | 6/1992 | Kriz et al. | 348/100 |
| 5,319,744 A | * | 6/1994 | Kelly et al. | 345/427 |
| 5,345,280 A | * | 9/1994 | Kimura et al. | 348/745 |
| 5,369,450 A | * | 11/1994 | Haseltine et al. | 315/368.12 |
| 5,398,083 A | * | 3/1995 | Tsujihara et al. | 315/368.13 |
| 5,465,121 A | * | 11/1995 | Blalock et al. | 348/744 |
| 5,473,391 A | * | 12/1995 | Usui | 348/746 |
| 5,504,496 A | * | 4/1996 | Tanaka et al. | 345/32 |
| 5,537,159 A | * | 7/1996 | Suematsu et al. | 348/745 |
| 5,627,605 A | * | 5/1997 | Kim | 348/745 |
| 5,748,264 A | * | 5/1998 | Hegg | 348/746 |
| 5,764,311 A | * | 6/1998 | Bonde et al. | 348/746 |
| 6,002,454 A | * | 12/1999 | Kajiwara et al. | 348/806 |
| 6,005,611 A | * | 12/1999 | Gullichsen et al. | 348/211 |
| 6,072,544 A | * | 6/2000 | Gleim et al. | 315/368.13 |
| 6,108,054 A | * | 8/2000 | Heizmann et al. | 348/745 |
| 6,111,616 A | * | 8/2000 | Chauvin et al. | 315/368.11 |
| 6,191,827 B1 | * | 2/2001 | Segman et al. | 348/747 |

* cited by examiner

Primary Examiner—Jeffery Brier
Assistant Examiner—Ryan Yang
(74) Attorney, Agent, or Firm—Thorpe North & Western

(57) ABSTRACT

A method for anticipation and tracking eye movement for head tracked projectors which divides a projection surface into spherical triangles and uses interpolating calibration values stored at each vertex of the triangle. A calibration map is used that contains information about the relationship between the user's head orientation and where they are looking with their eyes at each calibration point. The projection surface is divided into spherical triangles which are searched to find the triangle which contain the user's interpolated view point by performing a dot product test between the interpolated view point and the unit normal vectors inside the three planes that make up the sides of the spherical triangle extended back to the eye point. When a dot product test fails for any side of the triangle the pointer is followed to the adjacent triangle where the test starts over. When the triangle is found that has the interpolated view point inside it, the selected triangle is divided into three sub-triangles. Then the area of the sub-triangles inside the selected triangle is computed. The areas of the sub-triangles are then used to find ratios of the sub-triangles' areas versus the selected spherical triangle area for weighting the calibration points stored with each vertex. Then the weighted calibrations are added to the values for the interpolated view point. This creates a calibrated view point where the head tracked projector is then pointed and the computer generated simulated image is projected.

20 Claims, 5 Drawing Sheets

METHOD AND APPARATUS FOR MULTI-LEVEL IMAGE ALIGNMENT

TECHNICAL FIELD

This invention relates generally to calibrating the deflection in a vector or raster image projector, and more particularly to correction of distortion in projection display systems which use cathode ray tubes (CRTs) to project raster images.

BACKGROUND ART

In a projection display system using cathode ray tubes (CRTs), a computer image generator produces simulated high resolution raster images which are projected onto a projection surface. When a raster image is projected using a CRT projection system, the image is often distorted. The sources of image distortion include but are not limited to: off axis projection and viewing; non-planar display surfaces (e.g. domes or curved screens); and nonlinear errors in the electronics, optics and magnetic devices in the system. The correction of the image for distortion sources is commonly performed by distorting the CRT's raster shape.

Historical methods of adjusting the CRT raster have included linear corrections, non-linear corrections, or digital simulation of-linear and non-linear corrections. Other methods of error correction are based-on interpolated surface correction values including, values organized as a matrix of bilinear interpolation values or spline surface error correction.

For each of these methods, the user adjusts a set of control parameters to make the image appear correct for a given view location, projector placement, display surface and the current state of the projection system.

The historical methods of adjusting analog electronic circuits to correct for image distortions have now been replaced by digital methods. The analog circuits required careful adjustments and had problems of stability and drift common to analog electronics.

The use of digital simulations of the analog corrections provided a system which had the stability of digital methods and separated the correction electronics from the user controls. Since the analog electronics attempted to correct each of the sources of error with a separate circuit, the early digital simulations performed this same modeling.

It was found that the modeling of each possible error source was cumbersome. First, there is the problem of identifying all of the potential sources of error. Then there is the problem of creating a suitable set of error correction equations. This results in needing to adjust many error functions. Geometric errors introduced by the projection onto a screen and viewed from a different location than the projection source, require a different model for each projection surface shape. It is also difficult to know which combination of error functions needs to be adjusted to calibrate the CRT's raster for an observed visual distortion. This required an iterative calibration technique since there was an interaction between the collection of functions. It also allowed a technician to "work into a corner" which would require them to reset the controls and start over.

Interpolated surface error correction is a much more general solution. Interpolated surfaces do not attempt to model each error source. Rather, it is a method of reacting to total errors as a single adjustable function in two dimensions. The surface control points can be generated in a number of ways. Originally the digital simulations of the analog correction models were used to set the control point values. Direct user adjustments of the control point values was later introduced.

The control surface to interpolate for the correction values can be implemented using any number of interpolation methods. For ease of hardware implementation of the interpolation, one method currently used in the art is bilinear interpolation. For bilinear interpolation to appear smooth, a very large number of control points must be used. It is cumbersome and time consuming for the user to adjust all of the bilinear control points directly. The current state of the art allows a user to directly adjust the control points for a bicubic spline surface which is interpolated to generate the bilinear control point values used by the hardware. With recent hardware advances it would now be possible to directly implement the bicubic spline surface in hardware and drop the step of using the bilinear surface. Bicubic spline surfaces have the advantage of being second order continuous and thus do not introduce the discontinuities introduced by piecewise bilinear surfaces. It is thus possible to use far fewer control points.

When using the spline surface correction, the user adjusts a set of control points 18, as shown in FIG. 1, to make them match up with a set of alignment points. The alignment points represent the correct location of the control points 18 for a properly calibrated system. The user must adjust all of the control points 18 on the spline surface. For the surface to be easy to calibrate, the number of points to adjust must be kept to a minimum. In direct opposition to the desire to have a minimum number of control points, larger numbers of control points provide more localized adjustment which is a capability that may be necessary to provide the required calibration accuracy. It is best not to add too many control points for two reasons. First, the time to adjust the system increases with the number of control points. Second, extra control points increase the order of the correction surface with the potential of creating wiggles in the correction. FIG. 2 illustrates a misplaced point anomaly 19 that can be introduced by individual control point adjustments (i.e a wiggle). Another limitation, in using the spline surfaces is apparent when looking at the physics of the system. From a mathematical view of the spline surface, any amount of adjustment can be performed with each control point being totally independent in placement. In reality, control point adjustment is not independent of the physical drive limitations in the electronics and magnetic components of the image projector. A large adjustment in one point will cause other control points to appear to move or drift.

Accordingly, it would be an improvement over the state of the art to provide a new method and apparatus for adjusting control points in a control grid where the adjustments do not introduce misplaced points, wiggles or drift through the correction process.

It would also be an improvement in the art to provide an effective method to adjust control points in a control grid which more effectively represents the physical drive limitations in the electronics and magnetic components of the image projector.

OBJTECTS AND SUMMARY OF THE INVENTION

It is an object of the present invention to provide a method and apparatus for adjusting control points for control grids in an image display where the adjustments to the control points do not introduce misplaced points.

It is another object of the invention to provide a method and apparatus for adjusting control points in control grids which saves calibration time.

It is another object of the invention to provide a method and apparatus for adjusting control points in control grids which minimizes the problem of raster drift.

It is another object of the invention to provide a method and apparatus for adjusting controls points in control grids using an intermediate delta surface which is then added to the resulting surface shape.

It is yet another object of the invention to provide a method and apparatus for adjusting control points in control grids using bicubic interpolation between the adjusted points and the original surface shape.

The present invention is realized in a method and apparatus for multi-level image adjustment. The method for multi-level image alignment has a base grid with control points. The first step in the method is creating a delta surface with a plurality of control points equal to the number of control points in the base grid. In addition, the delta surface control point values are set to zero. The next step is defining a control grid with a desired number of control points from the base grid. Then an adjustment value is entered for a selected control point in the control grid. The derivatives at each point must be calculated in the control grid in both the U and V directions. The next step is interpolating the delta surface based on each control point's derivatives to generate a modified delta surface. Finally, the delta surface is added to the base surface to form an adjusted raster surface for display.

An alternative embodiment of the invention is an apparatus for multi-level image alignment in a raster image display system with a user interface. The apparatus has a coarse grid with a plurality of adjustment points provided to a user through the user interface. The grid allows the user to interactively adjust the points to correct distortion in a raster based image. The invention also has a plurality of control grids having control points provided to the user through the user interface. Each control grid has progressively more points than the coarse grid and the previous control arid, so the user can adjust the points which also adjusts the raster image projected by the raster image display system.

These and other objects, features, advantages and alternative aspects of the present invention will become apparent to those skilled in the art from a consideration of the following detailed description taken in combination with the accompanying drawings.

DISCLOSURE OF THE INVENTION

Reference will now be made to the drawings in which the various elements of the present invention will be given numerical designations and in which the invention will be discussed so as to enable one skilled in the art to make and use the invention. It is to be understood that the following description is only exemplary of certain embodiments of the present invention, and should not be viewed as narrowing the claims which follow.

This invention is a method and apparatus that incorporates the flexibility of spline surfaces which have many control points with a system that is simple to use because a minimum number of control points are calibrated for the image display system. The preferred embodiment of this invention uses control points in a grid which allows for correction of the raster image in a cathode ray tube (CRT) image projection system. It should be realized that this invention could also be used in other types of image systems where the image is distorted because of display on a curved surface, projection errors and similar problems described above. For example, image distortion may be used in a system where more pixels are displayed than exist in the original image (i.e. the display is higher frequency than the image), such as a video wall with several monitors where many pixels display elements are used to represent one pixel. In such a'system, it is important to control the pixel placement and this invention provides a way to control the pixel placement. Another example of a system which can use this invention is an LCD projector type system where the user can control where the pixels are placed in the LCD raster panel array to correct for distortion before they are projected.

Figure 1:
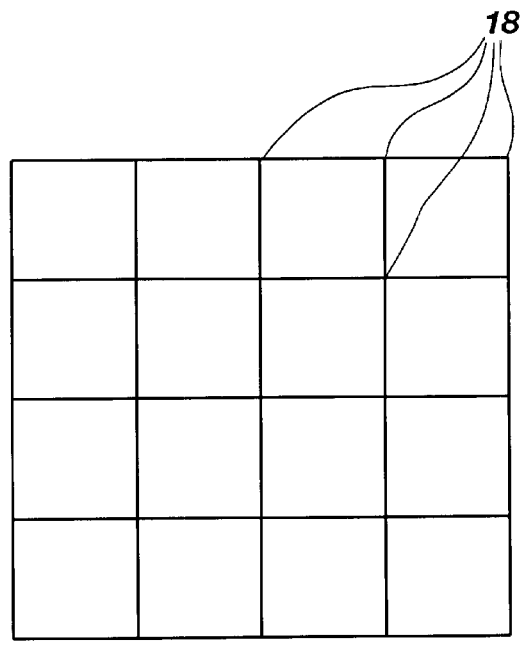
FIG. 1 is a grid of control points which are adjustable by a user.
Figure 2:
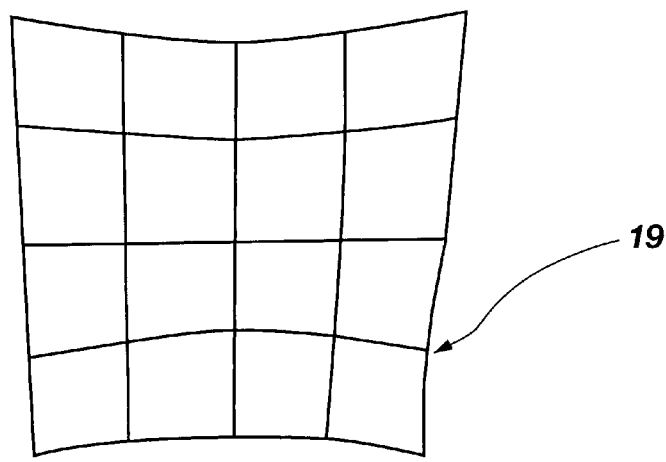
FIG. 2 is a grid of control points after the control points have been adjusted by a user.
Figure 3:
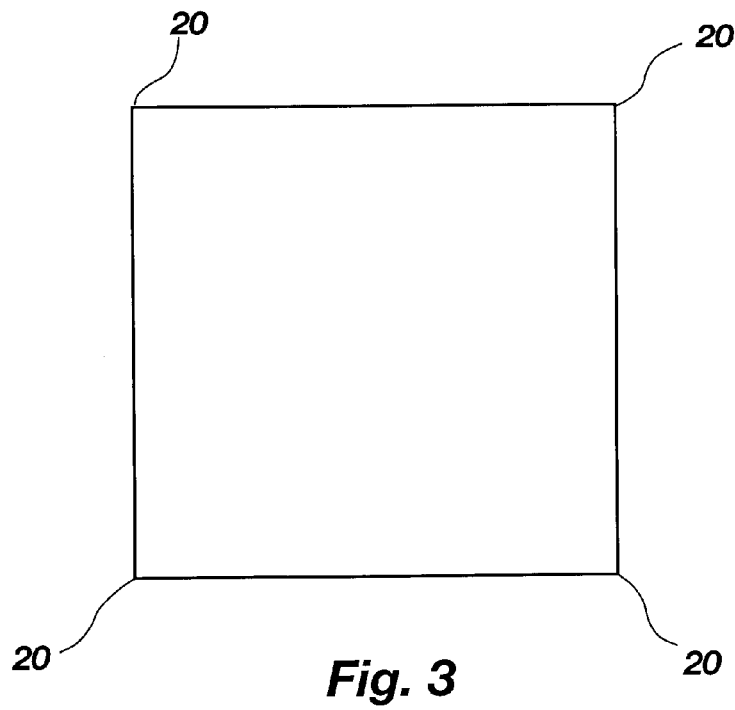
FIG. 3 shows a 2×2 control grid with four correction points.
Figure 4:
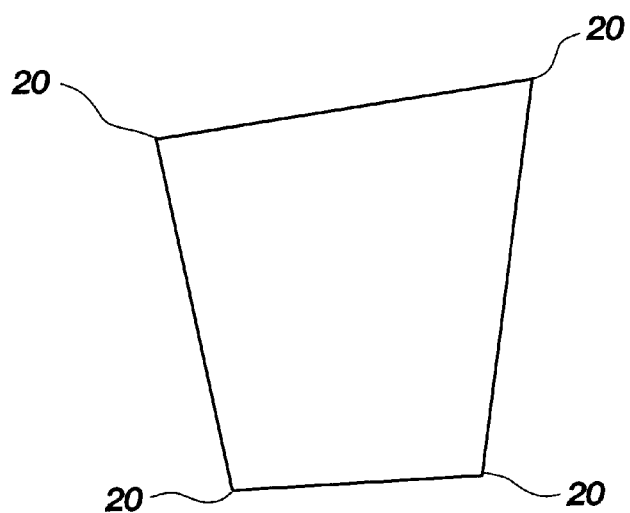
FIG. 4 is a 2×2 control grid with four correction points showing corrections made to those points.
Figure 5:
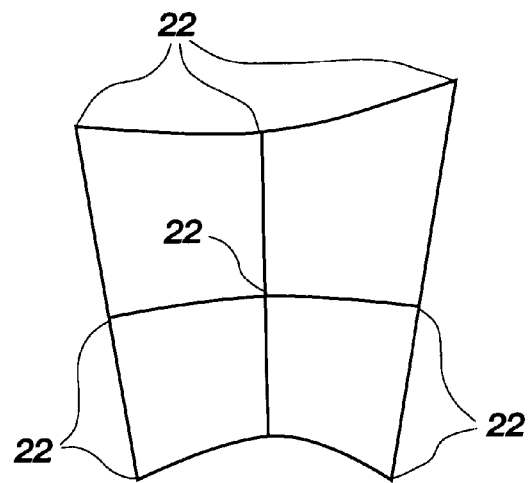
FIG. 5 is a 3×3 control grid with nine correction points.

In the preferred embodiment of the invention, the correction of the displayed image is accomplished by presenting to the user several levels of control points. Referring to FIG. 3, the user initially calibrates the four corner control points 20 in the 2×2 grid, which applies the correction across the full screen. This is referred to as level 0 calibration. FIG. 4 shows the 2×2 grid after the control points 20 have been adjusted. At the next level, the user adjusts a finer grid of control points and thus a more localized area of the raster. The user continues to refine the calibration using finer and finer control point grids until the calibration is complete. At any time the user can return to a coarser calibration grid to influence larger areas of the raster. By starting with a 2×2 grid at level 0, the user is able to quickly correct for size, offset, sheer, and trapezoid distortion shapes. It should be realized that this invention has a means for selecting the different control grid levels through either a graphical user interface in software, conventional switches in hardware, or some equivalent method. FIG. 5 shows a 3×3 grid, which adds the equivalent analog corrections of pincushion, and geometric scallops. This is referred to as level 1 calibration. Finer levels of control allow corrections of distortions caused by ripples in the display screen, or other forms of oscillations in the image and more localized distortions.

Figure 6:
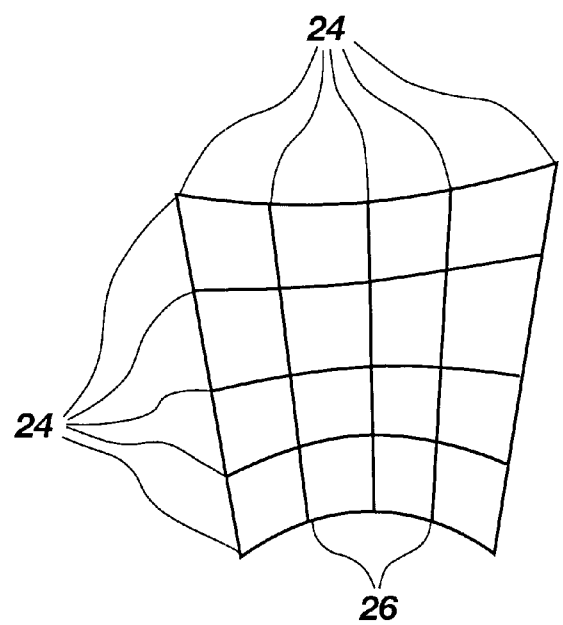
FIG. 6 is a 5×5 control grid with twenty-five correction points.

In one embodiment of the invention, each finer level subdivides the previous level sections in half. Thus, level 0 is a 2×2 grid with control points at the corners of the raster as shown in FIG. 3. Level 1 is a 3×3 grid equally dividing the screen into 4 areas as shown in FIG. 5. Level 2 is a 5×5 grid as shown in FIG. 6, and level 3 is a 9×9 grid (not shown). This pattern may continue until the number of control points shown in the control grid is equal to the points in the base grid.

Referring again to FIG. 3 the level 0, 2×2 grid is shown with no correction added to the control points 20. FIG. 4 shows correction values added to the level 0 grid. FIG. 5 shows additional correction added to FIG. 4 using level 1 or 3×3 grid control points 22. FIG. 6 shows performing another level of control point correction 24 to the corrections already performed in FIGS. 4 and 5. It can be seen in FIG. 6 that finer adjustments are made where needed. For example, two control points 26 have been adjusted to give the bottom of the grid in FIG. 6 a more rounded shape than the bottom of the grid shown in FIG. 5. It should be apparent based on this disclosure that finer and finer levels of controls points could be used as permitted by available memory and design constraints. Further, this invention is not limited to subdivisions of half of the previous level with each level change. An alternative embodiment of the invention uses subdivision spacing for the level changes allowing different grid arrangements. An example of another possible grid division ratio is dividing the grid sections into thirds, fifths, etc. An alternative embodiment of the present invention uses other grid ratios such as 5×7, 7×9, 9×13, etc. Other equivalent schemes could be used, such as doubling the number of control points at each level or increasing the points in different predefined patterns (e.g. a hexagon, an octagon or geometric patterns). The controls could also adjust groups of control points, such as a single control to adjust a certain control point group, and provide a direct adjustment to the x,y offset.

The current invention has a number of advantages. One advantage is the calibration of the system can be performed with a minimum number of control points. Since the calibration is performed using the larger global adjustments first followed by finer adjustments, the amount each control point must be adjusted at each level is minimized. Another advantage derived from this invention is that many points may be adjusted without actually selecting the points and manually adjusting them. Adjustments to points at finer levels may be determined by the adjustment of points in the coarse levels (e.g. level 0 or 1). In other words, the incremental adjustment to each control point is minimized, and it is easier to produce a smoother calibration over the whole raster. By using a minimum number of control points to accomplish a given adjustment, the incremental adjustment to each control point is minimized and the smoothness of the calibration is improved and the wiggles are reduced.

An additional advantage of the invention is that by starting with the 2×2 or 3×3 grids, the general geometric raster shape is quickly defined. Because the general geometric raster shape is defined more quickly, the calibration process is faster and fewer adjustments are performed on the remaining control points in the finer grids. Since the incremental adjustment to each control point is minimized, the potential for the introduction of misplaced joints which negatively affect the interaction between the control points in the physical hardware and projection system is reduced. The use of multiple selectable levels also allows for high level adjustments without losing ability to fine tune using very fine control grids.

Yet another advantage of the current invention is that the calibration data is accumulated in a single surface providing rapid update calculations for the raster correction. Storing all the corrections in a single surface also allows for compact data storage.

Figure 7:
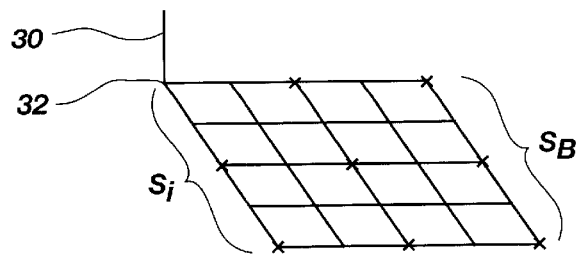
FIG. 7 shows a grid which is a delta surface represented by Xs and a base grid level which is a 5×5 grid of correction points.

The method for combining the control points with the final raster surface shape will now be described. It should be mentioned that the system stores the total correction of all the grid levels in a base grid that is equal to or finer than the finest control grid available to the user. This is referred to as the base surface ($S_B$). FIG. 7 shows a base surface which is a 5×5 grid and a 3×3 control matrix has been selected in FIG. 7 as represented by the X at each of the appropriate points. As adjustments are performed at a specific level, the delta change values are entered into a delta surface ($S_i$) at the location of the control point(s) being adjusted. All the other control points' values are set to zero in the delta surface. Referring again to FIG. 7, the delta surface ($S_i$) points are determined by the selected control level and then the correction 30 is added to point 32 (or points). Of course there is a means for selecting the individual points through a graphical user interface in software, through conventional switches in hardware, or some equivalent device.

Figure 8:
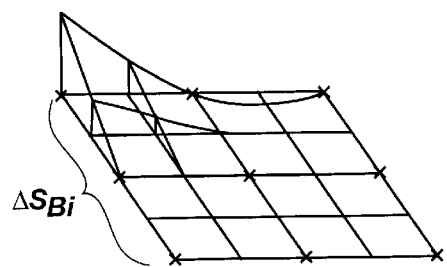
FIG. 8 shows a delta base surface with the same number of grid points as the base surface.
Figure 9:
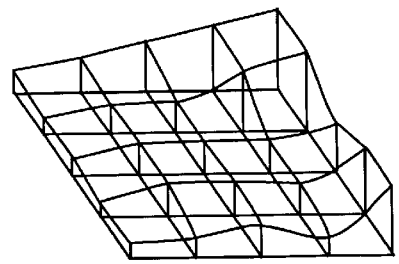
FIG. 9 shows the original shape of the base raster surface.
Figure 10:
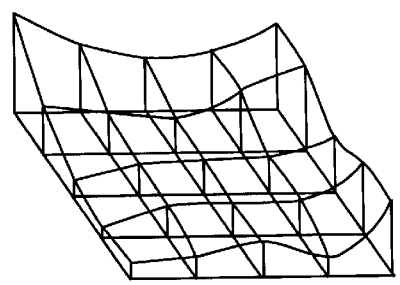
FIG. 10 is a new base surface created from the combination of FIGS. 8 and 9.

Each time an adjustment is made a new delta surface is created. FIG. 8 shows that each delta surface ($S_i$) is interpolated to create a delta base surface ($\Delta S_{Bi}$) with the same number of grid points as the base surface. The delta surface is interpolated by calculating the derivatives at each point and interpolating the bicubic surface according to the calculated points and derivatives at the points. The delta base surface of FIG. 8 creates a base surface with a 5×5 grid because that is the base grid size used in this example and in FIG. 7. FIG. 9 shows the original shape of the base raster surface. The delta base surface (FIG. 8) is summed into the base surface (FIG. 9) resulting in a new base surface as shown in FIG. 10. The delta surface and delta base surface are discarded as the information is now stored in the base surface. Of course, the delta surface may be kept and stored to support an "undo" function which would allow the user to reverse their previous changes.

The following statements are symbolic representations of the method of this invention where the subscript i denotes an iteration:

| | |
|---|---|
| 1. Adjustment → $S_i$ | FIG. 7 |
| 2. $S_i$ → $\Delta S_{Bi}$ | FIG. 8 |
| 3. $\Delta S_{Bi} + \Delta S_{B(i-1)}$ → $S_{Bi}$ | FIG. 10 |

The base surface is then used to compute the correction to the raster deflection for each pixel in the raster. This results in controlling the placement of the raster on the CRT faceplate using the adjustment performed. It should be realized that there are many different possible surface implementations which could be used that are well known to those skilled in the art of modeling surfaces. In addition, the interpolation of the delta surface can also be performed in any number of ways which are well known.

The preferred embodiment of the invention uses the base surface to indirectly control the raster deflection through a bilinear interpolation matrix. The base surface is used to compute the values stored in the bilinear interpolation matrix. These values are then used to perform a bilinear interpolation for each pixel in the image. The result of that interpolation is applied to the projector deflection to create the correct image. The mapping of the base surface to the bilinear interpolation matrix is performed by software while the interpolation of the bilinear interpolation matrix for each pixel is performed by the projector hardware. In the current implementation of this invention the surface interpolation is implemented as Bessel end point Hermite form. The mathematical forms of representing curves and curved surfaces are discussed in detail in *Computer Graphics: Principles and Practice*, Foley, 1996, Second Edition, Addison-Wesley Publishing Company.

A more detailed discussion of the surface interpolation will now be discussed. The surface is composed of a set of bicubic surface patches with corners at the control points. For each patch, the Hermite form uses the values ($P_{ij}$), the slopes $$\left(\frac{\partial P_{i,j}}{\partial u} \text{ and } \frac{\partial P_{i,j}}{\partial v}\right)$$

and twist vectors $$\left(\frac{\partial^2 P_{1,1}}{\partial u \partial v}\right)$$

at the four corners to form the control matrix [P].

To compute the correction value P(x,y) for a given x,y pixel location, the x and y location is used to select the patch and then the u,v parametric position in the patch. The correction value P(u,v) within the patch is computed by the equation $$P(u,v) = [U][N]^{-1}[P][N]^{-1}[V]^T \quad \text{(Equation 1)}$$

where $$[P] = \begin{bmatrix} P_{1,1} & P_{1,2} & \frac{\partial P_{1,1}}{\partial v} & \frac{\partial P_{1,2}}{\partial v} \\ P_{2,1} & P_{2,2} & \frac{\partial P_{2,1}}{\partial v} & \frac{\partial P_{2,2}}{\partial v} \\ \frac{\partial P_{1,1}}{\partial u} & \frac{\partial P_{1,2}}{\partial u} & \frac{\partial^2 P_{1,1}}{\partial u \partial v} & \frac{\partial^2 P_{1,2}}{\partial u \partial v} \\ \frac{\partial P_{2,1}}{\partial u} & \frac{\partial P_{2,2}}{\partial u} & \frac{\partial^2 P_{2,1}}{\partial u \partial v} & \frac{\partial^2 P_{2,2}}{\partial u \partial v} \end{bmatrix} \quad \text{(Equation 2)}$$

$$[N]^{-1} = \begin{bmatrix} 1 & 0 & 0 & 0 \\ 0 & 0 & 1 & 0 \\ -3 & 3 & -2 & -1 \\ 2 & -2 & 1 & 1 \end{bmatrix} \quad \text{(Equation 3)}$$

$$[U] = [1 \ u \ u^2 \ u^3] \quad \text{(Equation 4)}$$

$$[V] = [1 \ v \ v^2 \ v^3] \quad \text{(Equation 5)}$$

In the current implementation, the second partial derivatives $$\left(\text{twist vectors } \frac{\partial^2 P_{1,1}}{\partial u \partial v}\right)$$

in the P matrix are set to zero. This does not have adverse effects for the application of the bicubic surfaces in this invention. The derivatives $$\left(\frac{\partial P_{i,j}}{\partial u} \text{ and } \frac{\partial P_{i,j}}{\partial v}\right)$$

are calculated from the control points alone in each row and column using Bessel end point conditions. Bessel end point conditions use three control points at the end of a row or column to calculate the slope at the end point as the slope of a parabolic curve through, these three points.

To find slopes at each control point in both the vertical and horizontal directions, a curve is constructed through the line of control points. Calculating the slopes can be performed in any number of mathematical ways which are well known to those skilled in the art. The solution is accomplished by solving for each $p_k'$ in the set of equations $$P_k(t) = A_{k,0} + A_{k,1}t + A_{k,2}t^2 + A_{k,3}t^3$$

$$P_k'(1) = P_{k+1}'(0)$$

$$P_k''(1) = P_{k+1}''(0)$$

which results in $$P_{k-1}' + 4P_k' + P_{k+1}' = 3(P_{k+1} - P_{k-1})$$

and for k=1 and k=n+1

$$P_1' = -\tfrac{3}{2}P_1 + 2P_2 - \tfrac{1}{2}P_3$$

$$P_{n+1}'' = \tfrac{1}{2}P_{n-1} - 2P_n + \tfrac{3}{2}P_{n+1}$$

Which can be represented in matrix form as:

$$C \, P' = G \, P \quad \text{(Equation 6)}$$

for P' (the slope's vector) where P is the position vector of values along the row or column being calculated.

$$P' = C^{-1} \, G \, P \quad \text{(Equation 7)}$$

For Bessel (or parabolic slope) end conditions the C matrix and G matrix are of the form $$[C] = \begin{bmatrix} 1 & 0 & 0 & 0 & 0 & \cdots & \cdots & \cdots \\ 1 & 4 & 1 & 0 & 0 & \vdots & \vdots & \vdots \\ 0 & 1 & 4 & 1 & 0 & \vdots & \vdots & \vdots \\ \vdots & \vdots & \vdots & \vdots & \vdots & \vdots & \vdots & \vdots \\ \vdots & \vdots & \vdots & 0 & 1 & 4 & 1 & 0 \\ \vdots & \vdots & \vdots & 0 & 0 & 1 & 4 & 1 \\ \cdots & \cdots & \cdots & 0 & 0 & 0 & 0 & 1 \end{bmatrix} \quad \text{(Equation 8)}$$

$$[G] = \begin{bmatrix} -3/2 & 2 & -1/2 & 0 & 0 & \cdots & \cdots & \cdots \\ -3 & 0 & 3 & 0 & 0 & \vdots & \vdots & \vdots \\ 0 & -3 & 0 & 3 & 0 & \vdots & \vdots & \vdots \\ \vdots & \vdots & \vdots & \vdots & \vdots & \vdots & \vdots & \vdots \\ \vdots & \vdots & \vdots & 0 & -3 & 0 & 3 & 0 \\ \vdots & \vdots & \vdots & 0 & 0 & -3 & 0 & 3 \\ \cdots & \cdots & \cdots & 0 & 0 & 1/2 & -2 & 3/2 \end{bmatrix} \quad \text{(Equation 9)}$$

Figure 11:
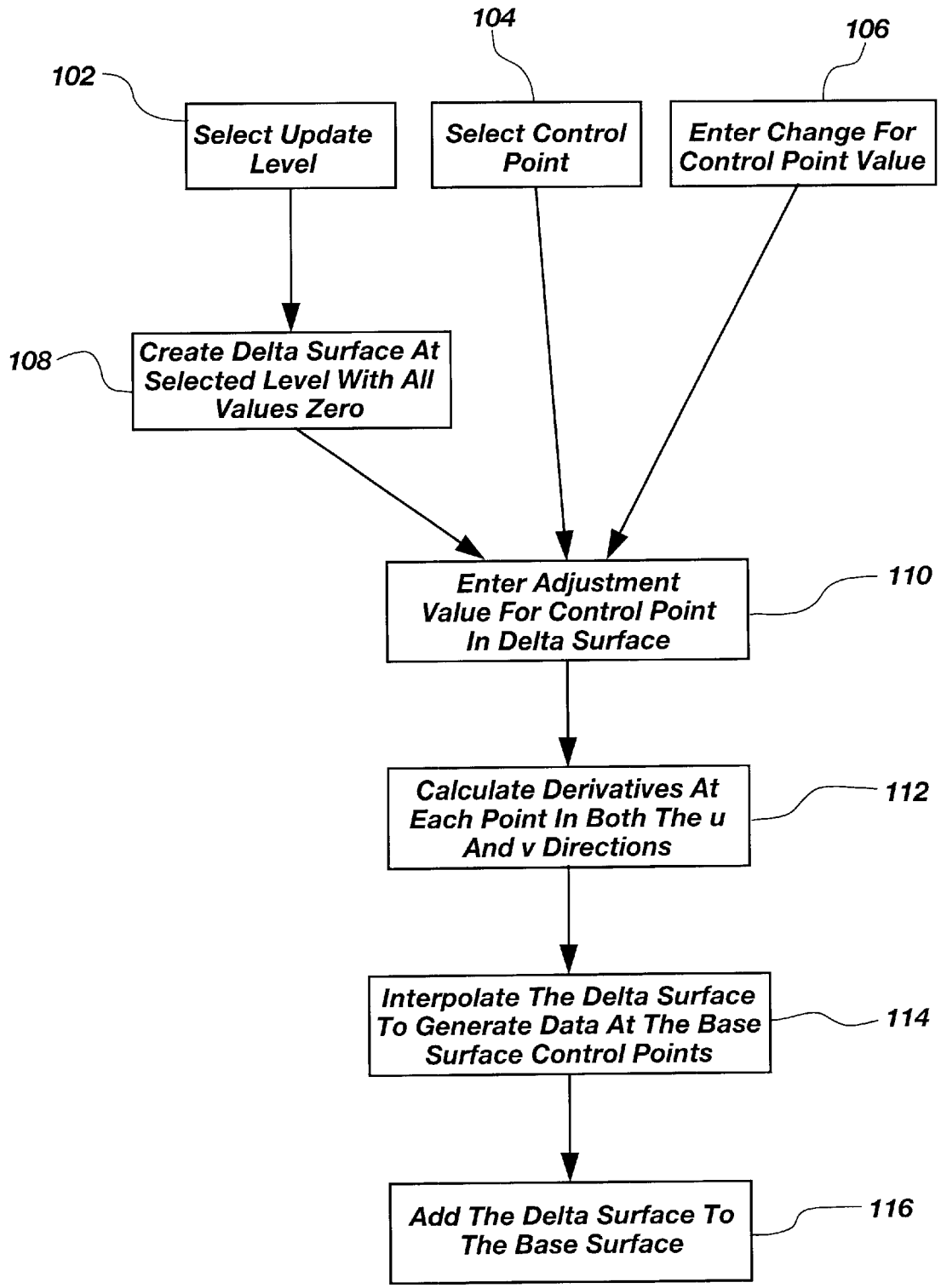
FIG. 11 is a flow chart of the steps of the current invention.

In summary, the flow chart shown in FIG. 11 shows the major steps of the preferred embodiment of the present invention. First a user must select an update level through the user interace of a projection based display system, as in step 102. The next step is to create a delta surface with all the values being zero 108. Then the user selects a specific control point that they wish to correct 104 and the user enters a change for the control point value 106. Next, the change for the selected control point is entered in the delta surface 110 (see also FIG. 6). After that the derivatives at each point in the delta surface are calculated in both the u and v directions 112 and then the delta surface is interpolated to generate data at the base surface control points 114 using equation 1 (see also FIG. 7). Finally, the modified delta surface is added to the base surface 116 (see FIG. 9).

It is to be understood that the above-described arrangements are only illustrative of the certain applications of the present invention. Numerous modifications and alternative arrangements may be devised by those skilled in the art without departing from the spirit and scope of the present invention.

What is claimed is:

1. A method for multi-level image alignment using a base grid with control points, comprising the steps of:
   (a) creating a delta surface having a plurality of control points equal to a number of control points in the base grid wherein the delta surface control point values are set to zero;
   (b) defining a control grid with a desired number of control points from the base grid;
   (c) entering an adjustment value for a selected control point in the control grid;
   (d) calculating derivatives at each point in the control grid in both U and V directions;
   (e) interpolating the delta surface based on each control point's derivatives to generate a modified delta surface;
   (f) adding the delta surface to the base surface to form an adjusted raster surface for display.

2. A method for multi-level image alignment in a raster image display system, comprising the steps of:
   (a) generating a base grid with a plurality of adjustment points which a user can interactively adjust;
   (b) providing multiple grid levels wherein each grid level contains a sub-set of the plurality of adjustment points from the base grid;
   (c) selecting a grid level and the adjustment points to modify;
   (d) adjusting selected adjustment points to allow image distortion errors to be corrected;
   (e) choosing progressively finer grid levels of adjustment wherein each grid level has adjustment points and the points at finer grid levels are automatically adjusted to align in relation to points adjusted at coarser grid levels;
   (f) adjusting the progressively finer grid levels until a desirable adjustment has been reached; and
   (g) incorporating grid adjustments into the base raster surface.

3. The method as in claim 2 wherein step (b) of providing multiple grid levels further comprises the steps of:
   creating a 2×2 grid having adjustment points presented to the user for interactive user adjustment; and
   adjusting any of the points present on the grid which automatically adjusts finer adjustment points in the base grid which cannot be adjusted in the 2×2 grid.

4. The method of claim 3 wherein the method further comprises the steps of:
   generating a 3×3 adjustment grid to present to the user for interactive user adjustment; and
   adjusting any of the points in the 3×3 grid which automatically adjusts the finer adjustment points in the base grid.

5. The method as in claim 2 wherein the step of choosing progressively finer grid levels further comprises the step of choosing progressively finer grid levels by dividing the previous subdivisions on the grid level by half.

6. The method as in claim 2 wherein the step of choosing progressively finer grid levels further comprises the step of choosing progressively finer grid levels by dividing previous grid level subdivisions into smaller sub-divisions.

7. The method as in claim 2 wherein step (b) of providing multiple grid levels further comprises the steps of:
   creating a first grid level which is a 2×2 grid; and
   providing subsequent grid levels with adjustment points by dividing grid areas by a selected numerical factor.

8. The method as in claim 2 wherein step (b) of providing multiple levels of grid control points further comprises the steps of:
   providing a first level grid which is a 2×2 grid;
   providing a second level grid which is a 3×3 grid;
   providing a third level grid which is a 5×5 grid; and
   providing a fourth level grid which is a 9×9 grid.

9. A method for multi-level image alignment, the method comprising the steps of:
   (a) generating a 2×2 grid having adjustment points to present to the user for interactive user adjustment;
   (b) adjusting any of the points present on the grid which in turn automatically adjusts finer adjustment points through the 2×2 grid;
   (c) generating a 3×3 adjustment grid to provide to the user for interactive user adjustment;
   (d) adjusting any of the points on the grid which automatically adjusts finer adjustment points which cannot be adjusted at the 3×3 adjustment level;
   (e) creating progressively finer grid levels of adjustment each having adjustment points wherein the finer points are adjusted relative to the points adjusted at coarser grid levels;
   (f) adjusting the progressively finer grid levels until the finest grid level has been reached and adjusted; and
   (g) incorporating the grid adjustments into a base raster surface.

10. An apparatus for multi-level image alignment in a raster image display system with a user interface, comprising:
    a coarse grid with a plurality of adjustment points provided to a user through the user interface wherein a user can interactively adjust the points to correct distortion in a raster based image; and
    a plurality of control grids having control points provided to the user through the user interface wherein each control grid has progressively more points than the coarse grid and the previous control grid, so the user can adjust the points which also adjusts the raster image projected by the raster image display system.

11. The apparatus of claim 10 further comprising a selection means for selecting one of the control grids provided through the user interface wherein a desired level of adjustment with an appropriate number of points in the grid can be adjusted.

12. The apparatus of claim 10 further comprising a cathode ray tube (CRT) projection device for which the raster image is to be adjusted and projected through for viewing.

13. The apparatus of claim 10 wherein the coarse grid is selected from the group consisting of a 2×2 grid, 3×3 grid, 5×5 grid, 7×7 grid and a 9×9 grid, wherein each of the points presented in the coarse grid automatically adjusts points at a finer grid level.

14. The apparatus as in claim 13 wherein the coarse grid can be further broken down into progressively finer control grid levels by dividing control grid areas by half to provide additional control grid points which can be individually adjusted.

15. The apparatus as in claim 13 further comprising a selection means for selecting a desired control point for adjustment.

16. The apparatus as in claim 10 wherein each control grid and coarse grid is represented as a bicubic spline surface.

17. The apparatus as in claim 10 further comprising a delta surface with a number of control points equal to the control points in a currently selected control grid wherein each of point in the delta surface has not been initially adjusted and then adjustment values are added to the delta surface points to create adjusted control points.

18. The apparatus as in claim 17 further comprising an interpolation means to interpolate between unadjusted points in the delta surface and adjusted control points by calculating derivatives at each control point with respect to an adjusted control point and then adjusting the delta surface points to create a smooth curve between the adjusted point and previously unadjusted points, and then adding the delta surface to a base surface to form an adjusted raster surface which is used by the raster image display system.

19. The apparatus as in claim 10 further comprising a base surface to store all of the adjustments made to the control points.

20. An apparatus for multi-level image alignment in a raster image display system with a user interface, comprising:

a coarse grid with a plurality of adjustment points provided to a user through the user interface wherein a user can interactively adjust the points to correct distortion in a raster based image; and a plurality of control grids having control points provided to the user through the user interface wherein each control grid has progressively more points than the coarse grid and the previous control grid, so the user can adjust the points which also adjusts the raster image projected by the raster image display system; and an intermediate surface to temporarily store adjusted control points and interpolated surface curvatures, wherein values in the intermediate storage surface are added to a base surface and then the intermediate surface is reset to zero.

* * * * *

UNITED STATES PATENT AND TRADEMARK OFFICE
CERTIFICATE OF CORRECTION

PATENT NO. : 6,433,840 B1
DATED : August 13, 2002
INVENTOR(S) : Poppleton

It is certified that error appears in the above-identified patent and that said Letters Patent is hereby corrected as shown below:

<u>Title page,</u>
Item [57], ABSTRACT, delete and replace with the following:
--      A method and apparatus is provided for multi-level image alignment using a base grid with conrol points. A delta surface is created with control points equal to the number of control points in the base grid. The delta surface control point values are then set to zero. A control grid is defined with desired number of control points from the base grid. An adjustment value is entered for a selected control point in the control grid. Derivatives are calculated at each point in the control grid in both U and V directions. The delta surface is interpolated based on each control point's derivatives to generate a modified delta surface. The delta surface is added to the base surface to form an adjusted raster surface for display. --

Signed and Sealed this

Eleventh Day of May, 2004

JON W. DUDAS
*Acting Director of the United States Patent and Trademark Office*